US010926385B2

(12) United States Patent
Myers et al.

(10) Patent No.: US 10,926,385 B2
(45) Date of Patent: Feb. 23, 2021

(54) CONTACT TRIP HAVING MAGNETIC FILTER

(71) Applicant: Black & Decker, Inc., New Britain, CT (US)

(72) Inventors: Merrill Myers, Parkville, MD (US);
Stuart E. Garber, Towson, MD (US);
Diego A. Tejada, Street, MD (US);
William R. Stumpf, Essex, MD (US)

(73) Assignee: Black & Decker, Inc., New Britain, CT (US)

( * ) Notice: Subject to any disclaimer, the term of this patent is extended or adjusted under 35 U.S.C. 154(b) by 101 days.

(21) Appl. No.: 15/899,530

(22) Filed: Feb. 20, 2018

(65) Prior Publication Data

US 2018/0243889 A1    Aug. 30, 2018

Related U.S. Application Data

(60) Provisional application No. 62/463,129, filed on Feb. 24, 2017.

(51) Int. Cl.
| | |
|---|---|
| *B25B 23/12* | (2006.01) |
| *B25C 1/00* | (2006.01) |
| *B25C 1/18* | (2006.01) |
| *H02K 11/33* | (2016.01) |
| *B25B 21/00* | (2006.01) |
| *B25B 21/02* | (2006.01) |
| *B25F 5/02* | (2006.01) |

(52) U.S. Cl.
CPC ............ *B25B 23/12* (2013.01); *B25B 21/002* (2013.01); *B25B 21/02* (2013.01); *B25C 1/008* (2013.01); *B25C 1/188* (2013.01); *B25F 5/021* (2013.01); *H02K 11/33* (2016.01)

(58) Field of Classification Search
CPC .......... B25C 1/008; B25C 1/00; B25C 1/188; B25C 5/1665; B25C 1/04; B25C 1/47; B25C 1/18
USPC ........................................................ 227/113
See application file for complete search history.

(56) References Cited

U.S. PATENT DOCUMENTS

| | | |
|---|---|---|
| 1,526,025 A | 2/1925 | Street |
| 2,594,605 A | 4/1952 | Zoppelt |
| 2,745,689 A | 5/1956 | Balint et al. |
| 2,822,698 A | 2/1958 | Gross |
| 2,979,725 A | 4/1961 | Wandel et al. |

(Continued)

FOREIGN PATENT DOCUMENTS

| | | |
|---|---|---|
| DE | 29917830 U1 | 3/2000 |
| EP | 218778 B1 | 11/1990 |

(Continued)

OTHER PUBLICATIONS

Extended European Search Report, dated Mar. 12, 2018.

(Continued)

*Primary Examiner* — Chelsea E Stinson
(74) *Attorney, Agent, or Firm* — Rhonda Barton

(57) ABSTRACT

A powered driving tool, such as a nailer, having a magnetic filter in the contact trip that retains ferrous debris remaining in the nosepiece as a result of a first fastener being driven into a workpiece, and allows the ferrous debris to be expelled from the nosepiece with a portion of a second fastener, when the second fastener is driven into a workpiece.

7 Claims, 4 Drawing Sheets

(56) References Cited

U.S. PATENT DOCUMENTS

| | | | |
|---|---|---|---|
| 3,172,124 A * | 3/1965 | Kremiller | B25C 1/041 227/8 |
| 3,225,443 A | 12/1965 | Young | |
| 3,480,210 A | 11/1969 | Perrinjaquet | |
| 3,563,438 A * | 2/1971 | Doyle | B25C 1/003 227/8 |
| 3,570,739 A | 3/1971 | Volkmann et al. | |
| 3,603,281 A | 9/1971 | Froelich | |
| 3,658,229 A * | 4/1972 | Pomeroy | B25C 1/087 227/10 |
| 3,659,768 A | 5/1972 | Brunelle | |
| 3,743,159 A | 7/1973 | Schneider | |
| 3,765,588 A * | 10/1973 | Frederickson | B27F 7/13 227/113 |
| 3,768,846 A | 10/1973 | Hensley et al. | |
| 3,774,293 A | 11/1973 | Golsch | |
| 3,820,705 A * | 6/1974 | Beals | B25C 1/005 227/113 |
| 3,827,822 A | 8/1974 | Converse | |
| 3,890,058 A | 6/1975 | Self et al. | |
| 3,893,610 A | 7/1975 | Smith | |
| 3,979,040 A * | 9/1976 | Denin | B25C 1/02 227/113 |
| 4,033,499 A * | 7/1977 | Butler | B25C 5/1693 227/120 |
| 4,049,181 A * | 9/1977 | Kametaki | B25C 1/005 227/113 |
| 4,129,240 A | 12/1978 | Geist | |
| 4,186,862 A | 2/1980 | Klaus | |
| 4,197,974 A | 4/1980 | Morton et al. | |
| 4,230,249 A | 10/1980 | Nasiatka et al. | |
| 4,270,587 A | 6/1981 | Ludy | |
| 4,270,687 A * | 6/1981 | Maurer | B25C 1/005 227/113 |
| 4,304,349 A | 12/1981 | Novak et al. | |
| 4,313,552 A * | 2/1982 | Maurer | B25C 1/005 227/109 |
| 4,314,782 A | 2/1982 | Beekenkamp | |
| 4,316,513 A * | 2/1982 | Harris | E21F 9/00 173/91 |
| 4,389,012 A * | 6/1983 | Grikis | B25C 1/005 221/198 |
| 4,403,725 A * | 9/1983 | Lawrence | B25C 1/02 227/147 |
| 4,404,894 A | 9/1983 | Oesterle | |
| 4,416,172 A * | 11/1983 | Medinger | B25B 23/06 81/57.37 |
| 4,424,929 A * | 1/1984 | Weis | B25B 31/00 227/113 |
| 4,468,159 A | 8/1984 | Oster | |
| 4,485,952 A * | 12/1984 | Weis | B25C 5/1693 227/10 |
| 4,487,355 A * | 12/1984 | Ginnow | B27F 7/13 227/112 |
| 4,519,535 A | 5/1985 | Crutcher | |
| 4,558,811 A | 12/1985 | Klaus | |
| 4,566,621 A | 1/1986 | Becht | |
| 4,597,517 A | 7/1986 | Wagdy | |
| 4,667,747 A * | 5/1987 | Falls | B25C 3/008 173/90 |
| 4,765,786 A | 8/1988 | Krogh | |
| 4,807,793 A | 2/1989 | Ghibely | |
| 4,834,342 A * | 5/1989 | Padgett | B25C 1/02 227/113 |
| 4,854,393 A | 8/1989 | Palet | |
| 4,863,089 A | 9/1989 | McCardle et al. | |
| 4,912,848 A | 4/1990 | Bidanset | |
| 4,967,623 A * | 11/1990 | Jackson | B25C 3/008 81/44 |
| 5,025,968 A * | 6/1991 | Nasiatka | B25C 1/008 227/31 |
| 5,074,453 A * | 12/1991 | Tachihara | B25C 1/043 227/130 |
| 5,134,812 A | 8/1992 | Hoffman et al. | |
| 5,165,827 A | 11/1992 | Miller | |
| 5,192,012 A * | 3/1993 | Schafer | B25C 1/001 227/113 |
| 5,261,588 A | 11/1993 | Lin | |
| 5,297,886 A | 3/1994 | Jansen et al. | |
| 5,368,213 A | 11/1994 | Massari | |
| 5,405,071 A | 4/1995 | Baugus | |
| 5,462,127 A | 10/1995 | Svensson | |
| 5,478,002 A * | 12/1995 | Clement | B23P 19/006 227/113 |
| 5,484,094 A * | 1/1996 | Gupta | B25C 1/18 227/113 |
| 5,495,973 A * | 3/1996 | Ishizawa | B25C 1/047 227/8 |
| 5,575,051 A * | 11/1996 | Moore | B21J 15/043 173/162.1 |
| 5,588,577 A | 12/1996 | Chen | |
| 5,647,525 A * | 7/1997 | Ishizawa | B25C 1/00 227/113 |
| 5,649,661 A | 7/1997 | Masuno et al. | |
| 5,683,024 A * | 11/1997 | Eminger | B25C 1/00 227/113 |
| 5,695,108 A | 12/1997 | Lee | |
| 5,711,471 A * | 1/1998 | White | B25C 1/00 227/113 |
| 5,779,145 A | 7/1998 | Zelle et al. | |
| 5,782,395 A | 7/1998 | Sauer | |
| 5,813,588 A * | 9/1998 | Lin | B25C 1/005 227/109 |
| 5,816,468 A | 10/1998 | Yang | |
| 5,831,817 A | 11/1998 | Chang | |
| 5,921,562 A | 7/1999 | Robinson | |
| 5,931,364 A * | 8/1999 | Dennis | B25C 5/06 227/109 |
| 6,036,072 A | 3/2000 | Lee | |
| 6,053,389 A | 4/2000 | Chu et al. | |
| 6,056,181 A | 5/2000 | Chuang | |
| 6,112,831 A | 9/2000 | Gustafsson | |
| 6,131,787 A | 10/2000 | Curtis | |
| 6,145,723 A * | 11/2000 | Gupta | B25C 1/08 227/113 |
| 6,149,046 A | 11/2000 | Ho et al. | |
| 6,161,744 A | 12/2000 | Mukoyama et al. | |
| 6,199,739 B1 | 3/2001 | Mukoyama et al. | |
| 6,308,879 B1 * | 10/2001 | Wang | B25C 1/00 227/113 |
| 6,364,192 B1 * | 4/2002 | Lin | B25C 1/047 227/113 |
| 6,371,348 B1 | 4/2002 | Canlas et al. | |
| 6,394,332 B2 | 5/2002 | Akiba | |
| 6,431,428 B1 | 8/2002 | Chen | |
| 6,557,743 B2 | 5/2003 | Schuster | |
| 6,585,142 B1 * | 7/2003 | Chen | B25C 1/04 227/113 |
| 6,598,775 B1 * | 7/2003 | Chen | B25C 7/00 227/113 |
| 6,598,777 B2 | 7/2003 | Osuga et al. | |
| 6,641,018 B2 | 11/2003 | Akiba | |
| 6,672,497 B2 | 1/2004 | Lin | |
| 6,691,907 B1 * | 2/2004 | Chang | B25C 1/008 227/130 |
| 6,769,591 B2 * | 8/2004 | Yamamoto | B25C 1/005 227/113 |
| 6,789,718 B2 * | 9/2004 | Canlas | B25C 7/00 227/130 |
| 6,796,475 B2 | 9/2004 | Adams | |
| 6,805,272 B1 * | 10/2004 | Sen-Mu | B25C 1/04 173/169 |
| D498,127 S | 11/2004 | Leasure | |
| 6,814,156 B2 | 11/2004 | Dieterle et al. | |
| 6,908,021 B1 | 6/2005 | Wang | |
| 6,913,180 B2 | 7/2005 | Schuster | |
| 6,918,527 B2 | 7/2005 | Hakozaki et al. | |
| D509,418 S | 9/2005 | Leasure | |
| 6,948,647 B1 | 9/2005 | Niblett et al. | |
| 6,966,477 B1 | 11/2005 | Chien-Kuo et al. | |

(56) References Cited

U.S. PATENT DOCUMENTS

| | | |
|---|---|---|
| 6,971,567 B1 | 12/2005 | Cannaliato et al. |
| 6,974,061 B2 | 12/2005 | Adams et al. |
| 6,974,062 B2 | 12/2005 | Akiba |
| 6,978,920 B2 | 12/2005 | Hamada et al. |
| 7,000,294 B2 | 2/2006 | Kakuda et al. |
| D520,839 S | 5/2006 | Miwa |
| 7,055,728 B2 | 6/2006 | Lin |
| 7,086,573 B1 | 8/2006 | Wen |
| 7,100,475 B1 * | 9/2006 | Rufolo, Jr. ............... B25C 3/008 81/44 |
| 7,134,586 B2 | 11/2006 | McGee et al. |
| 7,137,541 B2 | 11/2006 | Baskar et al. |
| 7,138,595 B2 | 11/2006 | Berry et al. |
| 7,140,524 B2 | 11/2006 | Hung et al. |
| 7,143,921 B2 | 12/2006 | Hakozaki et al. |
| 7,165,305 B2 | 1/2007 | Kenney et al. |
| 7,204,403 B2 | 4/2007 | Kenney et al. |
| 7,210,607 B2 | 5/2007 | Niblett et |
| D551,931 S | 10/2007 | Leasure |
| 7,285,877 B2 | 10/2007 | Gorti et al. |
| D556,003 S | 11/2007 | Buck |
| 7,303,103 B2 | 12/2007 | Wang |
| 7,322,506 B2 | 1/2008 | Forster |
| D562,664 S | 2/2008 | Buck |
| 7,328,826 B2 | 2/2008 | Shkolnikov |
| 7,331,403 B2 | 2/2008 | Berry et al. |
| 7,410,084 B1 * | 8/2008 | Reed ........................ B25C 1/00 227/119 |
| 7,413,103 B1 | 8/2008 | Ho et al. |
| 7,451,735 B2 | 11/2008 | Riley et al. |
| 7,469,811 B2 | 12/2008 | Shima et al. |
| 7,470,081 B2 | 12/2008 | Miyahara et al. |
| 7,484,647 B2 | 2/2009 | Yang |
| 7,494,036 B2 | 2/2009 | Shima et al. |
| 7,497,058 B2 | 3/2009 | Mårtensson |
| 7,503,401 B2 | 3/2009 | Gross et al. |
| 7,506,787 B2 * | 3/2009 | Wu ........................ B25C 1/008 227/120 |
| 7,513,402 B2 | 4/2009 | Miyashita et al. |
| 7,516,532 B2 * | 4/2009 | Wojcicki ................ B25C 1/005 227/109 |
| 7,552,852 B2 * | 6/2009 | Haskins ................... B25C 1/02 227/113 |
| 7,556,184 B2 | 7/2009 | Brendel et al. |
| 7,559,447 B2 | 7/2009 | Chen et al. |
| 7,565,992 B2 | 7/2009 | Buetow |
| 7,571,844 B2 * | 8/2009 | Bromley ................... B25C 1/04 227/120 |
| 7,575,140 B2 | 8/2009 | Jiang |
| 7,575,141 B1 | 8/2009 | Liang et al. |
| 7,575,142 B2 | 8/2009 | Liang et al. |
| 7,600,662 B2 | 10/2009 | Nayrac et al. |
| 7,637,408 B2 | 12/2009 | Takahashi et al. |
| 7,646,157 B2 | 1/2010 | Cruise et al. |
| 7,654,430 B2 | 2/2010 | Cho et al. |
| 7,686,199 B2 | 3/2010 | Gross et al. |
| 7,690,546 B2 | 4/2010 | Cortez |
| 7,708,505 B2 | 5/2010 | Opsitos, Jr. et al. |
| 7,726,536 B2 | 6/2010 | Gross et al. |
| 7,748,588 B2 | 7/2010 | Osuga et al. |
| 7,753,243 B2 | 7/2010 | Brendel et al. |
| 7,762,443 B2 * | 7/2010 | Tamura ................ B25C 5/1627 227/10 |
| 7,784,238 B2 | 8/2010 | Bannister |
| 7,788,997 B2 | 9/2010 | Kozak et al. |
| 7,789,169 B2 | 9/2010 | Berry et al. |
| 7,870,987 B1 | 1/2011 | Zhang et al. |
| 7,874,469 B2 | 1/2011 | Liu |
| 7,905,377 B2 | 3/2011 | Krondorfer et al. |
| 7,930,960 B2 | 4/2011 | Duginske |
| 7,934,565 B2 | 5/2011 | Krondorfer et al. |
| 7,934,566 B2 | 5/2011 | Hlinka et al. |
| 7,959,049 B2 | 6/2011 | Dittrich et al. |
| 7,975,893 B2 | 7/2011 | Berry et al. |
| 7,980,439 B2 | 7/2011 | Akiba et al. |
| 7,980,441 B2 | 7/2011 | Dittrich et al. |
| 7,997,467 B2 | 8/2011 | Hirabayashi et al. |
| 8,011,441 B2 | 9/2011 | Leimbach et al. |
| 8,011,547 B2 | 9/2011 | Leimbach et al. |
| 8,011,549 B2 | 9/2011 | Berry et al. |
| 8,025,197 B2 | 9/2011 | Brendel et al. |
| 8,042,717 B2 * | 10/2011 | Lam ........................ B25C 1/008 227/120 |
| RE42,987 E | 12/2011 | Akiba |
| 8,091,752 B2 | 1/2012 | Jian et al. |
| 8,104,658 B2 | 1/2012 | Yu |
| 8,123,099 B2 | 2/2012 | Kenney et al. |
| 8,136,606 B2 | 3/2012 | Krondorfer et al. |
| 8,167,182 B2 | 5/2012 | Shima et al. |
| 8,172,814 B2 | 5/2012 | Cane' |
| 8,230,941 B2 | 7/2012 | Leimbach et al. |
| 8,231,039 B2 | 7/2012 | Buck et al. |
| 8,240,534 B2 | 8/2012 | Hirabayashi |
| 8,256,528 B2 | 9/2012 | Oesterle et al. |
| 8,267,296 B2 | 9/2012 | Leimbach et al. |
| 8,267,297 B2 | 9/2012 | Leimbach et al. |
| 8,286,722 B2 | 10/2012 | Leimbach et al. |
| 8,292,143 B2 | 10/2012 | Lee et al. |
| 8,302,833 B2 | 11/2012 | Gross et al. |
| 8,313,012 B2 | 11/2012 | Shima et al. |
| 8,347,978 B2 | 1/2013 | Forster et al. |
| 8,381,830 B2 | 2/2013 | Puzio et al. |
| 8,387,718 B2 | 3/2013 | Leimbach et al. |
| 8,387,846 B2 | 3/2013 | Francis et al. |
| 8,408,327 B2 | 4/2013 | Forster et al. |
| 8,434,566 B2 | 5/2013 | Forster et al. |
| 8,439,242 B2 | 5/2013 | Tanji et al. |
| 8,505,798 B2 | 8/2013 | Simonelli et al. |
| 8,534,527 B2 | 9/2013 | Brendel et al. |
| 8,602,282 B2 | 12/2013 | Leimbach et al. |
| 8,631,986 B2 | 1/2014 | Hlinka et al. |
| 8,684,246 B2 | 4/2014 | Liang et al. |
| 8,763,874 B2 | 7/2014 | McCardle et al. |
| 8,777,081 B2 | 7/2014 | Chen et al. |
| 8,827,132 B2 | 9/2014 | Mina et al. |
| 8,875,804 B2 * | 11/2014 | Puzio ..................... B25F 5/003 173/2 |
| 8,925,233 B2 | 1/2015 | Thordsen |
| 8,991,675 B2 | 3/2015 | Liang et al. |
| 8,997,744 B2 | 4/2015 | Ho et al. |
| 9,010,493 B2 | 4/2015 | Jagdale et al. |
| 9,038,305 B2 | 5/2015 | Volfson |
| 9,120,028 B2 | 9/2015 | Wilson |
| 9,126,319 B2 | 9/2015 | Gross et al. |
| 9,194,637 B2 | 11/2015 | Mather |
| 9,346,156 B1 * | 5/2016 | Fago ........................ B25C 1/06 |
| 9,346,158 B2 | 5/2016 | Garber et al. |
| 9,399,281 B2 | 7/2016 | Brendel et al. |
| 9,459,075 B1 | 10/2016 | Hatcher |
| 9,469,021 B2 | 10/2016 | Gregory et al. |
| 9,486,904 B2 | 11/2016 | Gregory et al. |
| 9,498,871 B2 | 11/2016 | Gregory et al. |
| 9,527,196 B2 | 12/2016 | Segura |
| 9,577,493 B2 | 2/2017 | Ekstrom et al. |
| 9,643,200 B2 | 5/2017 | Belanger |
| 9,643,305 B2 | 5/2017 | Gregory et al. |
| 9,649,755 B2 | 5/2017 | Gregory et al. |
| 9,676,088 B2 | 6/2017 | Leimbach et al. |
| 9,744,657 B2 | 8/2017 | Baron et al. |
| 9,827,658 B2 | 11/2017 | Gregory et al. |
| 9,868,196 B2 | 1/2018 | Chien |
| 10,265,840 B2 | 4/2019 | Anstett et al. |
| 10,434,634 B2 | 10/2019 | Garber |
| 10,562,163 B2 | 2/2020 | Akiba |
| 10,604,172 B2 | 3/2020 | Yoon et al. |
| 10,661,470 B2 | 5/2020 | Bauer et al. |
| 2001/0038026 A1 | 11/2001 | Dickhaut |
| 2002/0104866 A1 | 8/2002 | Miller et al. |
| 2002/0117532 A1 | 8/2002 | Miller et al. |
| 2002/0174807 A1 | 11/2002 | Mason |
| 2002/0185514 A1 | 12/2002 | Adams et al. |
| 2003/0038786 A1 | 2/2003 | Nguyen et al. |

(56) References Cited

U.S. PATENT DOCUMENTS

| | | | |
|---|---|---|---|
| 2003/0146262 A1* | 8/2003 | Hwang | B25C 1/005 227/113 |
| 2003/0230622 A1 | 12/2003 | Rotharmel | |
| 2004/0169057 A1 | 9/2004 | Ronconi | |
| 2004/0222266 A1 | 11/2004 | Kakuda et al. | |
| 2005/0166713 A1* | 8/2005 | Lloyd | B25C 7/00 81/44 |
| 2005/0217416 A1 | 10/2005 | Berry et al. | |
| 2005/0220445 A1 | 10/2005 | Baskar et al. | |
| 2005/0242152 A1 | 11/2005 | Ronconi | |
| 2006/0102685 A1 | 5/2006 | Phillips et al. | |
| 2006/0231582 A1 | 10/2006 | Hong et al. | |
| 2006/0248998 A1 | 11/2006 | Duginske | |
| 2006/0272269 A1 | 12/2006 | Bannister | |
| 2006/0273131 A1 | 12/2006 | Chen | |
| 2007/0045345 A1 | 3/2007 | Monfeli et al. | |
| 2007/0090148 A1 | 4/2007 | Cho et al. | |
| 2007/0102471 A1 | 5/2007 | Gross et al. | |
| 2007/0261868 A1* | 11/2007 | Gross | A61B 17/8875 173/2 |
| 2008/0054043 A1* | 3/2008 | Beales | B25C 1/00 227/129 |
| 2008/0099525 A1* | 5/2008 | Brendel | B25C 1/008 227/8 |
| 2008/0135596 A1 | 6/2008 | Wu et al. | |
| 2008/0223894 A1 | 9/2008 | Cruise et al. | |
| 2008/0283568 A1 | 11/2008 | Nayrac et al. | |
| 2008/0290128 A1 | 11/2008 | Buetow | |
| 2008/0296340 A1 | 12/2008 | Wang | |
| 2009/0050668 A1 | 2/2009 | Jian | |
| 2009/0084824 A1 | 4/2009 | Jiang | |
| 2009/0108046 A1 | 4/2009 | Huang | |
| 2009/0120281 A1* | 5/2009 | Yang | B25C 1/047 92/172 |
| 2009/0145520 A1 | 6/2009 | Opsitos, Jr. et al. | |
| 2009/0152323 A1 | 6/2009 | Lin | |
| 2009/0266867 A1 | 10/2009 | Mina et al. | |
| 2010/0057014 A1 | 3/2010 | Cane | |
| 2010/0116863 A1 | 5/2010 | Suda | |
| 2010/0301091 A1 | 12/2010 | Liang et al. | |
| 2010/0308098 A1 | 12/2010 | Francis et al. | |
| 2011/0057014 A1 | 3/2011 | Yang et al. | |
| 2011/0114692 A1 | 5/2011 | Liang et al. | |
| 2011/0132959 A1 | 6/2011 | Hlinka et al. | |
| 2011/0198381 A1 | 8/2011 | McCardle et al. | |
| 2011/0215131 A1 | 9/2011 | Liang | |
| 2011/0278342 A1 | 11/2011 | Kuo | |
| 2011/0315414 A1 | 12/2011 | Kuntner et al. | |
| 2011/0315840 A1 | 12/2011 | Connolly et al. | |
| 2012/0074194 A1 | 3/2012 | Miller et al. | |
| 2012/0187177 A1 | 7/2012 | Myburgh et al. | |
| 2013/0029548 A1 | 1/2013 | Stenzel et al. | |
| 2013/0032368 A1* | 2/2013 | Zhang | B25F 5/029 173/1 |
| 2013/0153254 A1 | 6/2013 | Liang et al. | |
| 2013/0227869 A1 | 9/2013 | Thordsen | |
| 2013/0240299 A1 | 9/2013 | Jagdale et al. | |
| 2013/0306699 A1 | 11/2013 | Baskar et al. | |
| 2013/0320059 A1 | 12/2013 | Gregory et al. | |
| 2013/0320060 A1 | 12/2013 | Gregory et al. | |
| 2013/0320063 A1 | 12/2013 | Gregory et al. | |
| 2013/0320064 A1 | 12/2013 | Gregory et al. | |
| 2013/0320065 A1 | 12/2013 | Gregory et al. | |
| 2013/0320066 A1 | 12/2013 | Gregory et al. | |
| 2013/0320067 A1 | 12/2013 | Gregory et al. | |
| 2013/0320068 A1 | 12/2013 | Gregory et al. | |
| 2014/0069671 A1 | 3/2014 | Leimbach et al. | |
| 2014/0097223 A1 | 4/2014 | Baron et al. | |
| 2014/0158739 A1 | 6/2014 | Grazioli et al. | |
| 2014/0325886 A1 | 11/2014 | Mather | |
| 2014/0361066 A1 | 12/2014 | Liu et al. | |
| 2014/0373329 A1 | 12/2014 | Volfson | |
| 2015/0096776 A1 | 4/2015 | Garber | |
| 2015/0122867 A1 | 5/2015 | Segura | |
| 2015/0352702 A1 | 12/2015 | Chien | |
| 2016/0129573 A1 | 5/2016 | Anstett et al. | |
| 2017/0066116 A1 | 3/2017 | Garber et al. | |
| 2017/0232600 A1 | 8/2017 | King, Jr. | |
| 2018/0001454 A1 | 1/2018 | Jaskot et al. | |
| 2018/0001456 A1 | 1/2018 | Garber | |
| 2018/0015600 A1 | 1/2018 | Akiba | |
| 2018/0281840 A1 | 10/2018 | Yoon et al. | |
| 2018/0333888 A1* | 11/2018 | Bauer | B25C 1/04 |
| 2019/0091844 A1 | 3/2019 | Akiba | |
| 2019/0299380 A1 | 10/2019 | Meyer et al. | |

FOREIGN PATENT DOCUMENTS

| | | | |
|---|---|---|---|
| EP | 0931625 | A2 | 7/1999 |
| EP | 1206337 | B1 | 10/2004 |
| EP | 1207017 | B1 | 8/2006 |
| EP | 1798003 | A1 | 6/2007 |
| EP | 1884322 | A1 | 2/2008 |
| EP | 1795305 | B1 | 2/2010 |
| EP | 1864759 | B1 | 10/2010 |
| EP | 2105259 | B1 | 6/2011 |
| EP | 2065137 | B1 | 11/2011 |
| EP | 2105258 | B1 | 4/2012 |
| EP | 2441552 | A2 | 4/2012 |
| EP | 2687334 | B1 | 6/2016 |
| EP | 2711135 | B1 | 7/2016 |
| EP | 2301718 | B1 | 12/2016 |
| GB | 602455 | A | 5/1948 |
| JP | S5499276 | A | 8/1979 |
| JP | H06246649 | A | 9/1994 |
| JP | 2000354981 | A | 12/2000 |
| JP | 2002210676 | A | 7/2002 |
| WO | 2009/046076 | A1 | 4/2009 |
| WO | 2015164032 | A1 | 10/2015 |

OTHER PUBLICATIONS

International Search Report and Written Opinion dated Nov. 2, 2017 in corresponding International Patent Application No. PCT/US2017/039988.

Office Action in corresponding European Patent Application No. 17737706.6 dated Feb. 13, 2020.

International Search Report and Written Opinion dated Oct. 12, 2017 in corresponding International Patent Application No. PCT/US2017/039981.

Extended European Search Report dated Mar. 28, 2018 in corresponding U.S. Appl. No. 15/195,057.

Office Action in corresponding European Patent Application No. 17737194.5 dated Feb. 13, 2020.

Extended European Search Report dated Nov. 20, 2017 in corresponding U.S. Appl. No. 15/629,871.

Copenheaver, Blaine R.—International Search Report and Written Opinion re: related application No. PCT/US2017/039723—Sep. 6, 2017—7 pages.

Extended European Search Report dated Jan. 28, 2020 in corresponding U.S. Appl. No. 15/637,720.

Extended European Search Report dated Jan. 4, 2018 in corresponding U.S. Appl. No. 15/195,095.

Extended European Search Report dated Mar. 29, 2018 in corresponding U.S. Appl. No. 15/196,175.

Hilti DX460—at least as early as Mar. 17, 2016.
Hilti DX351—at least as early as Mar. 17, 2016.
Ramset XT540—at least as early as Mar. 17, 2016.
Hilti GX120—at least as early as Mar. 17, 2016.
Simpson GCN-MEPMAG—at least as early as Mar. 17, 2016.
Ramset Trackfast—at least as early as Mar. 17, 2016.
T3 Ramset—at least as early as Mar. 17, 2016.
Hilti GX2—at least as early as Mar. 17, 2016.

* cited by examiner

CONTACT TRIP HAVING MAGNETIC FILTER

CROSS-REFERENCE TO RELATED APPLICATIONS

The present invention claims priority under 35 U.S.C. § 119 to U.S. Provisional Application Ser. No. 62/463,129 entitled "Contact Trip Having Magnetic Filter" filed on Feb. 24, 2017, which is hereby incorporated by reference in its entirety.

BACKGROUND OF THE INVENTION

Field of the Invention

The present invention relates, in general, to the field of power tools. In particular, the present invention relates to a fastening or driving tool, such as a nailer having a magnetic filter in a lower contact trip.

Description of the Related Art

Fastening tools, such as power nailers have become relatively common place in the construction industry. Pneumatically-powered nailers, which are connected to an air compressor via an air hose, and powder nailers, which employ a powder fuel source that is rapidly combusted to produce a volume of pressurized gas, initially dominated the market. Both products, however, suffer from several drawbacks.

Pneumatically powered nailers require a relatively expensive air compressor that can be relatively cumbersome to transport. Additionally, it can be inconvenient to operate the nailer while it is tethered (via the air hose) to the air compressor. Many of the nailers powered by a powder fuel source are of the "single shot" variety and require significant effort to reload. Additionally, nailers employing a powder fuel source can be relatively noisy and can produce unpleasant odors during their operation.

Despite these limitations, pneumatic and powder-powered nailers continue to predominate for those construction applications, such as steel framing and concrete construction that employ fasteners requiring a high degree of power to install the fasteners. Hence, while cordless electric nailers have become very successful for use in conventional wood construction (i.e., framing and trimming), cordless electric power nailers of this type are presently not suitable for use in steel framing or concrete construction applications.

Accordingly, there is a need in the art for a cordless electric powered nailer that is capable of reliably installing concrete fasteners, including the installation of hardened fasteners through steel framing into concrete. In addition, due to the high energy of the powered nailer, broken nails or parts of the nail that is struck by the driver can break off and remain in the nosepiece. Nails can break when the driving tool drives nails into non-homogenous materials, such as wood and concrete. Nails can also break when incorrect nails are inserted into the magazine. Such broken parts, or ferrous debris, if left free in the nosepiece can be ingested into the engine of the tool.

Ferrous debris in the engine causes the tool to stop functioning properly and can break the tool components. As a result, there is also a need for preventing ferrous debris from entering the engine of the driving tool.

SUMMARY OF THE INVENTION

In an embodiment of the present invention, a driving tool includes a housing; a nosepiece connected to an end of the housing and having a cylindric body; a driver operatively translatable along a drive axis to engage and drive a fastener through the nosepiece and into a workpiece; a contact trip received in the cylindric body of the nosepiece and slidable between a retracted position and an extended position relative to the end of the nosepiece, the contact trip having an elongated body defining an aperture aligned with the drive axis and through which the fastener is driven by the driver into the workpiece; at least one pocket disposed within an outer wall of the contact trip; and at least one magnet disposed in each of the at least one pocket.

The at least one pocket includes a plurality of pockets, such as two pockets disposed on opposite lateral sides of the drive axis. The at least one magnet includes one magnet in each pocket, the magnets being arranged with opposing polarities facing the drive axis.

The plurality of pockets can also include at least two pairs of pockets disposed on opposite lateral sides and opposite longitudinal sides of the drive axis.

The contact trip can be formed from hardened steel and the at least one magnet can be an N50 grade magnet having a thickness that is less than the depth of the at least one pockets. The at least one magnet is magnetically retained within the at least one pocket. In the extended state of the contact trip, the at least one magnet remains within the nosepiece.

In an alternative embodiment, the at least one pocket defines an arcuate groove and/or a pair of arcuate grooves on opposite lateral sides of the drive axis.

In an embodiment of the present invention, a method of filtering and expelling ferrous debris from a nosepiece of a driving tool includes: providing a nosepiece having a contact trip retractably slidable therein and a driver translatable along a drive axis within the nosepiece to drive a first and second fastener into a workpiece; providing at least one pocket in an outer wall of the contact trip; inserting at least one magnet within the at least one pocket; driving the first fastener along the drive axis and retaining ferrous debris from the first fastener against an inner surface of the contact trip with a magnetic force provided by the at least one magnet; capturing the ferrous debris with a portion of the second fastener driven along the drive axis; and expelling the ferrous debris from the nosepiece with the second fastener.

The step of providing at least one pocket includes providing a pair of pockets on opposite lateral sides of the drive axis and the step of inserting at least one magnet includes inserting a magnet in each pocket such that opposite polarities of each magnet face the drive axis.

The step of providing at least one pocket can also include providing a pair of pockets on opposite lateral sides and opposite longitudinal sides of the drive axis.

The step of providing at least one pocket includes providing at least one arcuate groove around a portion of an outer wall of the contact trip and and/or a pair of arcuate grooves on opposite lateral sides of the drive axis.

BRIEF DESCRIPTION OF THE DRAWINGS

The numerous advantages of the present invention may be better understood by those skilled in the art by reference to the accompanying Figures. In the drawings, like reference numerals designate corresponding parts throughout the several views.

Corresponding reference numerals indicate corresponding parts throughout the several views of the drawings.

DETAILED DESCRIPTION OF THE INVENTION

Figure 1:
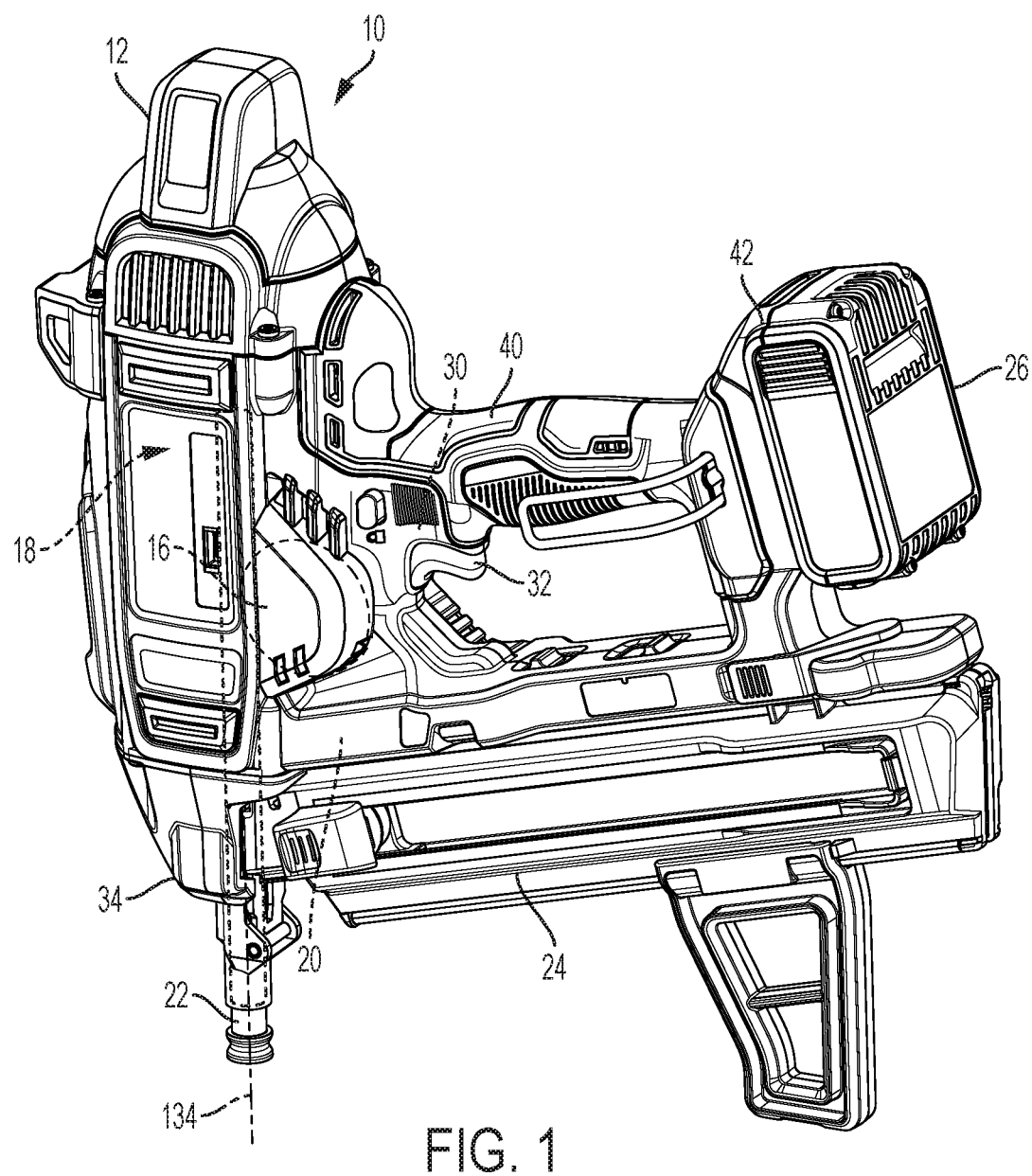
FIG. 1 is a perspective view of an exemplary driving tool constructed in accordance with the teachings of the present disclosure.

With reference to FIG. 1 of the drawings, a cordless fastening or driving tool, such as a nailer constructed in accordance with the teachings of the present disclosure is generally indicated by reference numeral 10. The driving tool 10 can include a housing 12, a frame 14, a drive motor assembly 16, a return mechanism 18, a control unit 20, a nosepiece assembly 22, a magazine assembly 24 and a battery pack 26. The nosepiece assembly 22, the magazine assembly 24 and the battery pack 26 can be constructed in a conventional manner and as such, need not be described in detail herein. The control unit 20 can include various switches, such as a trigger switch 30, which is responsive to a state of a trigger 32, and a contact trip switch (not shown), which is responsive to a state of a contact trip 460 associated with the nosepiece assembly 22, various sensors, such as a motor speed sensor (not shown), and a controller (not shown) that can receive signals from the various switches and sensors and responsively operate the drive motor assembly 16 and the return mechanism 18.

The housing 12 can be of a clam-shell construction that can be employed to cover various components of the driving tool 10, such as the drive motor assembly 16, the return mechanism 18 and the control unit 20. The housing 12 can form a handle 40 that can be grasped by the operator of the driving tool 10 to operate the driving tool, and a battery pack mount 42 to which the battery pack 26 can be fixedly but removably coupled. The nosepiece assembly 22 is connected to the forward end 34 of the housing 12.

Figure 2:
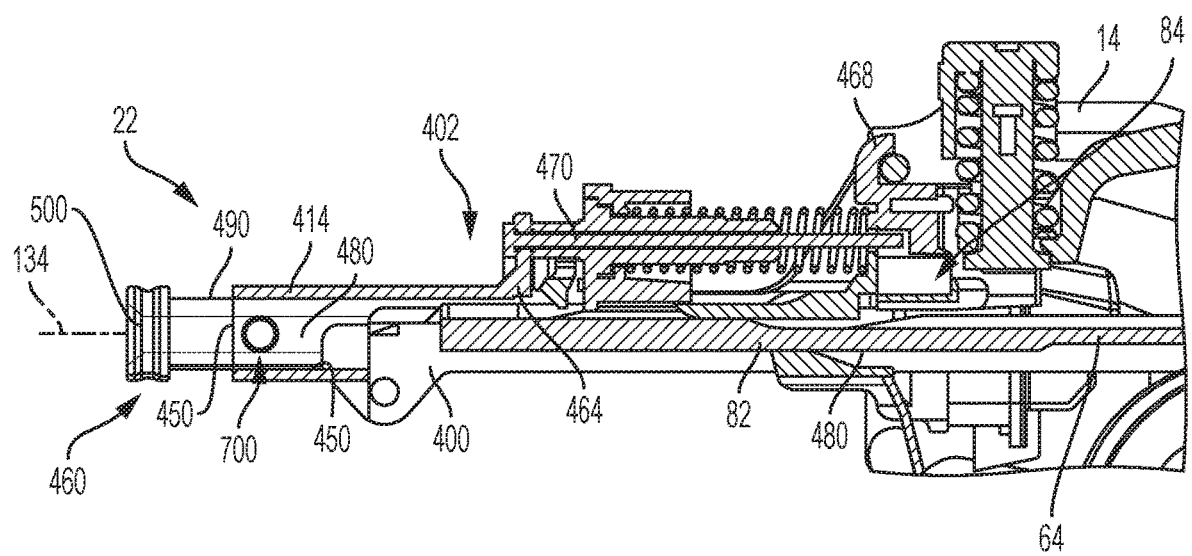
FIG. 2 is a side view of a portion of the nosepiece of the driving tool of FIG. 1.

With reference to FIG. 2, the frame 14 can be formed of one or more frame components and is the structure to which the drive motor assembly 16, the return mechanism 18 and the nosepiece assembly 22 can be fixedly coupled.

The drive motor assembly 16 includes a driver 64 operatively translatable along a drive axis to engage and drive the fastener. The driver includes a driver blade portion 82 arranged to strike the head of the fastener in a drive channel, and drive the fastener through the nosepiece assembly 22 and into a workpiece. The driver blade portion 82, which can be made from a metal, returns to an at-rest position by being drawn away from the drive channel by a driver tip lifter magnet 84.

As shown in FIG. 2, the nosepiece assembly 22 can include a nosepiece 400 and a contact trip mechanism 402. The nosepiece 400 can include a barrel or cylindric body 414 defining a bore or fastener outlet 450. The contact trip mechanism 402 can include a lower contact trip 460, a lower contact trip mount 464, an upper contact trip mount 468, and an upper contact trip assembly 470. Between the forward end 34 of the housing 12 and the fastener outlet 450 is defined a generally cylindrical fastener or drive channel 480.

The lower contact trip 460 can be slidably received into the fastener outlet 450 of the cylindric body 414. The lower contact trip 460 is slidable between a retracted position and an extended position relative to an end of the nosepiece 400. In the extended position, the lower contact trip 460 is at rest and in the retracted position, the distance between the forward or flanged end of the lower contact trip 460 and the fastener outlet 450 is reduced, such as when the lower contact trip is abutted against a workpiece. The lower contact trip 460 can have an elongated body that can include a fastener guide portion 490 at a forward end and a projecting portion 492 at a rear end thereof. The fastener guide portion 490 can be tubular and define a contact trip aperture 500 that is aligned with the drive axis 134. The contact trip aperture 500 is sized to receive one of the fasteners therethrough. When inserted into the fastener outlet 450 the lower contact trip 460 can line the lower portion of the drive channel 480 and define a passage for the fastener to exit the tool through the contact trip aperture 500. Thus, the fastener guide 490 serves as a guide for fasteners as the fasteners are driven through the fastener outlet 450. The projecting portion 492 can be fixedly coupled to the fastener guide portion 490 and can define a contact trip guide 502. The contact trip guide 502 can be configured to guide the driver blade 82 and/or an associated one of the fasteners as the driver 64 and fastener are translated along the drive axis 134. The opposite lateral sides 506 of the projecting portion 492 can contact guide rails (not shown) in the cylindric body 414 to inhibit rotation of the lower contact trip 460 relative to the cylindric body 414 when the lower contact trip 460 is translated relative to the cylindric body 414 along the drive axis 134. The lower contact trip 460 can be formed from a material such as a metal, and for example, hardened steel.

Figure 3:
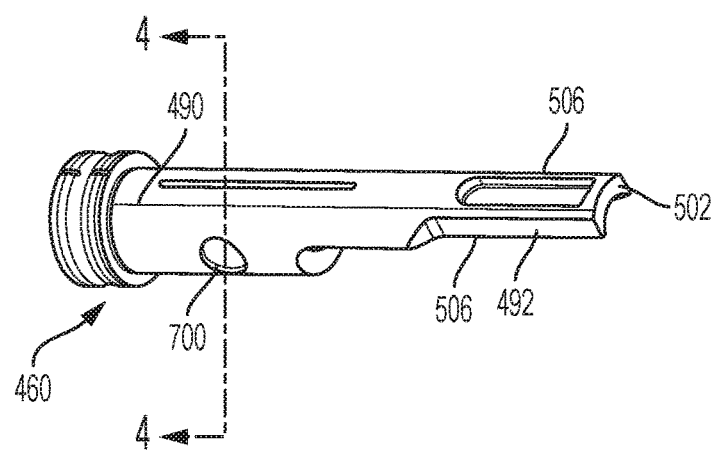
FIG. 3 is a perspective view of a lower contact trip illustrated as being removed from the nosepiece.

In an embodiment of the present invention, the lower contact trip 460 of the driving tool 10 includes at least one magnet in an outer wall 702 thereof. In the embodiment as shown in FIGS. 2 and 3, the lower contact trip 460 of the driving tool 10 includes a plurality of magnets 700 in the fastener guide portion 490. The magnets 700 filter ferrous debris caused by broken pieces of previously driven fasteners. The magnets 700 prevent the ferrous debris from being ingested into the engine and interfering with the driver tip lifter magnet 84 and other mechanisms of the driving tool. The magnets 700 collect and retain the ferrous debris from a first fastener in the lower contact trip 460. When a next fastener is driven, a portion of the fastener, such as a nail head, captures the ferrous debris held by the magnets 700, and carries the debris through the contact trip aperture 500 such that the debris is expelled from the nosepiece 400. Thus, the driven nail head clears the nosepiece 400 of the debris. As shown in FIGS. 2 and 3, the magnets 700 are located in an outer wall 702 of the fastener guide portion 490. The magnets 700 are located on a section of the fastener guide portion 490 that remains within the cylindric body 414 when the fastener guide portion 490 is in the extended position. As such, the magnets 700 are covered by the cylindric body 414 when the lower contact trip 460 is in an at-rest position, as shown in FIG. 2. When the lower contact trip 460 is abutted against a workpiece to urge the lower contact trip 460 along the drive axis 134, the magnets are urged rearward toward the housing 12.

Figure 4:
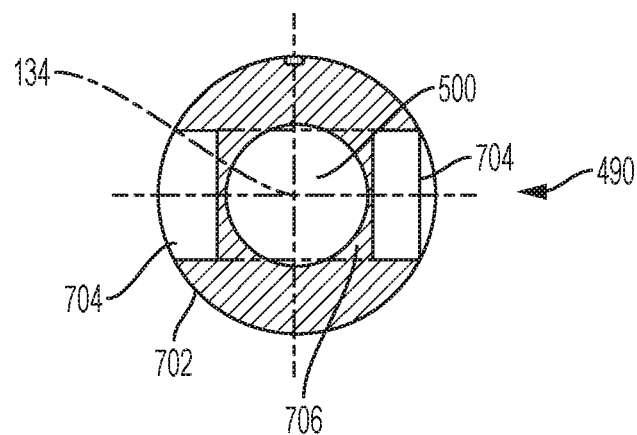
FIG. 4 is a section view taken along the line 4-4 of FIG. 3, with a lower contact trip illustrated as being removed from the nosepiece of the driving tool of FIG. 1.
Figure 5:
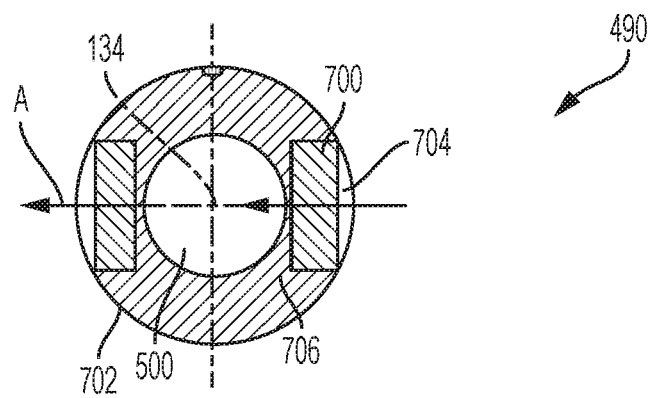
FIG. 5 is a section view of FIG. 4 illustrating magnets in the lower contact trip.

The magnets 700 can be positioned within a recess or pocket 704 in the outer wall 702 of the fastener guide portion 490. As shown in FIG. 4, the fastener guide portion 490 has a pair of pockets 704 on opposite lateral sides of the drive axis 134. The pockets 704 are located within the outer wall 702 of the fastener guide portion 490 and are separated from an inner wall 706 by material remaining after the pocket is formed. As shown in FIG. 5, the magnets 700 can be separated from the contact trip aperture 500 by the inner wall 706. Even though the magnets 700 are behind the inner wall 706 of the fastener guide portion 490, the magnetic force passes through the inner wall 705 and is sufficient to draw the ferrous debris to the inner wall 706. As a result of the magnetic force provided by the magnet located in the outer wall, the ferrous debris is retained or held against the inner wall or inner surface of the contact trip 460.

The magnets 700 can be magnetically fit within the pockets 704 so that the magnets do not become dislodged from or turned within the pocket when fastener guide portion 490 slides within the cylindric body 414. As an example, the magnets can be magnetically fit within a lower contact trip formed from a metal or ferromagnetic material, such as, for example, steel. Alternatively, the magnets 700 can be interference fit or glued within the pockets 704.

The magnets 700 can also be positioned within the pockets 704 to maintain the direction of polarity. As shown in FIG. 5, the magnets 700 can be arranged on opposite lateral sides of the drive axis 134 and with opposing polarities facing the drive axis. For example, in an arrangement with two magnets 700, one in each pocket 704, a first magnet can have a north polarity facing the drive axis 134 and a second magnet can have a south polarity facing the drive axis 134, as indicated by the direction of polarization, A. By arranging the magnets 700 in a specified orientation with opposing polarities facing the drive axis 134, the magnetic field is strengthened to collect debris more efficiently.

Figure 6:
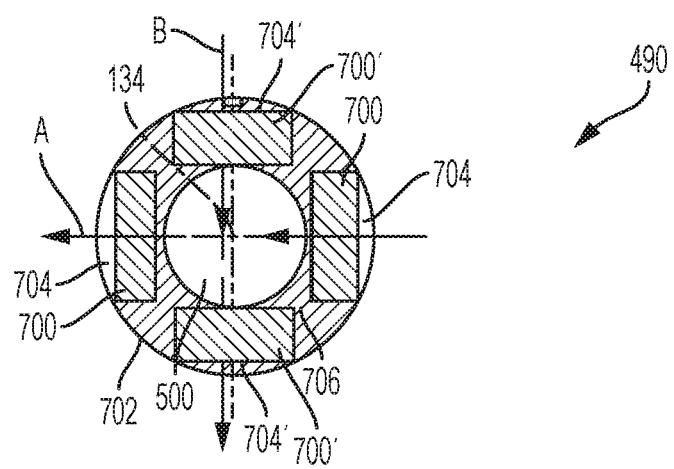
FIG. 6 is a section view of a second embodiment of a contact trip, illustrating magnets in the lower contact trip.

In an embodiment shown in FIGS. 4 and 5, the lower contact trip 460 of the driving tool 10, includes a pair of magnets 700, to retain the ferrous debris. However, the present invention is not limited to two magnets. Alternatively, any number of magnets can be used to retain ferrous debris and allow the release of the debris under the driving force of a fastener. In an embodiment shown in FIG. 6, the lower contact trip 460 can include four magnets each disposed within one of four pockets 704. In this arrangement, a first pair of pockets 704, each with a magnet 700, are disposed on opposite lateral sides of the drive axis 134 and a second pair of pockets 704', each with a magnet 700', are disposed on opposite longitudinal sides of the drive axis 134. The magnets are arranged with the opposite polarities facing the drive axis 134. As illustrated in FIG. 6, the magnets are arranged such that the laterally arranged magnets 700 have a direction of polarization A and the longitudinally arranged magnets 700' have a direction of polarization B.

Figure 7:
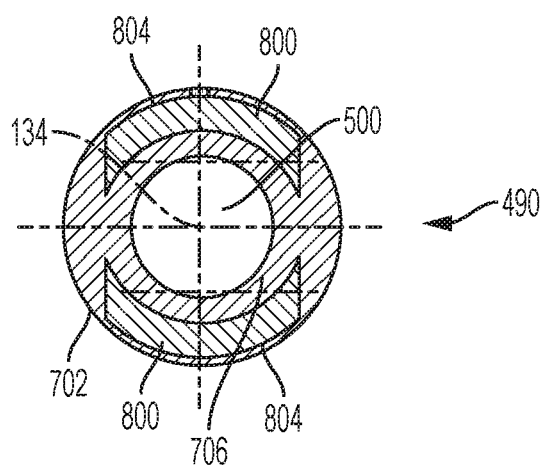
FIG. 7 is a section view of a third embodiment of a contact trip illustrating arcuate magnets in the lower contact trip.

In the embodiments of FIGS. 4, 5 and 6, the magnets 700, 700' are illustrated as circular and have a disk shape. The magnets 700, 700' are not limited to a circular shape and can have a variety of shapes. For example, in the embodiment illustrated in FIG. 7, the magnets 800 and corresponding pockets 804 can have an arcuate shape.

In an embodiment, the magnets 700, 700' and 800 can be N50 grade magnets. However, the present invention is not limited to N50 grade magnets and any grade of magnet can be used.

While aspects of the present invention are described herein and illustrated in the accompanying drawings in the context of a compressor, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

We claim:

1. A driving tool comprising:
    a housing;
    a nosepiece connected to an end of the housing and having a cylindric body;
    a driver operatively translatable along a drive axis to engage and drive a fastener through the nosepiece and into a workpiece;
    a contact trip received in the cylindric body of the nosepiece and slidable between a retracted position and an extended position relative to the end of the nosepiece, the contact trip having an elongated body defining an aperture aligned with the drive axis and through which the fastener is driven by the driver into the workpiece;
    at least one pocket disposed within an outer wall of the contact trip; and
    at least one magnet disposed in each of the at least one pocket in the contact trip,
    wherein a portion of the contact trip in which the at least one magnet is disposed, remains within the nosepiece in both the retracted and extended positions.

2. The driving tool according to claim 1, wherein the at least one pocket comprises two pockets disposed on opposite lateral sides of the drive axis.

3. The driving tool according to claim 2, wherein the at least one magnet comprises one magnet in each pocket, the magnets being arranged with opposing polarities facing the drive axis.

4. The driving tool according to claim 1, wherein the at least one magnet has a thickness that is less than the depth of the at least one pockets.

5. The driving tool according to claim 1, wherein the at least one magnet comprises an N50 grade magnet.

6. The driving tool according to claim 1, wherein the contact trip is formed from hardened steel.

7. The driving tool according to claim 1, wherein the at least one magnet is magnetically retained within the at least one pocket.

* * * * *